United States Patent [19]

Labes

[11] 3,932,298

[45] Jan. 13, 1976

[54] NEMATIC LIQUID CRYSTALS WITH CHARGE-TRANSFER ACCEPTORS AS DOPANTS

[75] Inventor: Mortimer M. Labes, Philadelphia, Pa.

[73] Assignee: Temple University, Philadelphia, Pa.

[22] Filed: July 19, 1973

[21] Appl. No.: 380,817

[52] U.S. Cl. ............... 252/299; 252/408; 350/150; 350/160 LC
[51] Int. Cl.² .......................................... G02F 1/16
[58] Field of Search ...... 252/408, 299; 350/160 LC, 350/150

[56] References Cited
UNITED STATES PATENTS

| | | | |
|---|---|---|---|
| 3,773,747 | 11/1973 | Steinstrasser | 252/408 X |
| 3,806,229 | 4/1974 | Schoot et al. | 252/408 X |
| 3,814,700 | 6/1974 | Aviram et al. | 252/408 LC |
| 3,815,972 | 6/1974 | Hsieh | 252/408 X |
| 3,838,059 | 9/1974 | Wong | 252/299 |

OTHER PUBLICATIONS

"Effect of Charge–Transfer Acceptors on Dynamic Scattering in a Nematic Liquid Crystal," A. Baise, I. Teucher & M. Labes, Appl. Phys. Lett., Vol. 21, No. 4, pp. 142–143 (Aug. 15, 1972).

"Nematic Liquid Crystal Materials for Displays," Linda Creagh, Proc. of the IEEE., Vol. 61, No. 7 (July 1973) pp. 814–822.

"On the Relation Between Molecular Structure & LC. Behavior," de Jeu, W. & van der Veen, J. Philips Res. Repts. Vol. 27 (2), pp. 172–185 (Apr. 1972).

Foster, R., Organic Charge–Transfer Complexes, Academic Press, New York, pp. 1–93, 252–275 (1969).

*Primary Examiner*—Leland A. Sebastian
*Assistant Examiner*—T. S. Gron
*Attorney, Agent, or Firm*—Paul & Paul

[57] ABSTRACT

Nematic liquid crystal compositions including a relatively small amount of a charge-transfer acceptor dopant exhibit substantially different voltage-transmission characteristics in dynamic scattering as compared to undoped nematic liquids. Nematic compositions based on azoxy compounds and dopants of the cyano or halo tetra substituted quinone types are preferred.

6 Claims, No Drawings

NEMATIC LIQUID CRYSTALS WITH CHARGE-TRANSFER ACCEPTORS AS DOPANTS

This invention pertains to nematic liquid crystal compositions including dopants and having improved dynamic scattering voltage-transmission characteristics, particularly including reduced threshold voltage in dc fields.

Dynamic scattering in nematic liquid crystal compositions under the influence of electrical fields is now well known, and numerous attempts have been made to modify various properties of such compositions. The addition of additives for such purposes has also been suggested. In various functional uses of such nematic liquid compositions, modified physical properties are often desirable. One such modified property is reduced threshold voltage, i.e., the voltage at which the dynamic scattering response is first effected. Another such variable characteristic is the nature of the electric field, such as alternating current versus direct current.

The general object of the present invention is to provide nematic liquid crystal compositions having improved characteristics suitable for display application.

More particularly, it is an object of this invention to provide such compositions having improved dynamic scattering voltage transmission characteristics, reduced threshold voltage for dynamic scattering, particularly under the influence of a dc field, and novel color effects.

These objects, and others which will be apparent in the course of the subsequent description of this invention, are met by nematic liquid crystal compositions consisting essentially of nematic liquids selected from the group consisting of azoxy, azo, ethylenic, and acetylenic linked dibenzenes, substituted at the para positions with substituents selected from the group consisting of lower alkyls and lower alkoxies (the lower alkyls and alkoxies each comprising a group of up to five carbons), the nematic liquid being combined with a small proportion, generally less than 0.1%, by weight, of a nonionic charge transfer acceptor dopant. Typical dopant compounds for this purpose are tetra substituted quinone compounds, wherein the substituents are either cyano or halo groups, or combinations of such groups. Such compounds include chloranil (tetrachloro-p-benzoquinone), DDQ (2,3-dichloro-5,6-dicyano-p-benzoquinone), and TCNQ (7,7,8,8-tetracyanoquinodimethane).

The present invention has been fully reported in a paper entitled "Effect of Charge-Transfer Acceptors on Dynamic Scattering in a Nematic Liquid Crystal," published in the Applied Physics Letters, Vol. 21, No. 4, Aug. 15, 1972, pages 142 and 143, authored by the present inventor along with A. I. Baise and I. Teucher.

As indicated therein, compositions of the present invention indicate that the addition of charge-transfer acceptors to a nematic liquid crystal at concentrations of less than 0.1%, by weight, has a profound effect on the voltage-transmission characteristic for dynamic scattering. Since the publication of that article, it has been found that this effect is observable in some compositions under the influence of an alternating current field. As reported in the Applied Physics Letters article, however, under the influence of a dc field, at least one such composition, namely a 0.1% TCNQ, remainder Phase V (a commercially available nematic liquid consisting of methoxy-n-butyl-azoxybenzene, actually a mixture of isomers wherein the opposite end positions of the methoxy and n-butyl substituents are reversed) was observed to have a threshold voltage for dynamic scattering under the influence of a dc field of 2.5 volts as opposed to a threshold of 5 volts for an undoped Phase V composition.

Similarly, the data in that article indicated that the voltage necessary to reduce the transmitted light intensity to 25% of the initial value was reduced from 12.5 volts (for undoped compositions) to 9.5 volts in Phase V compositions doped, respectively, with 0.1% TCNQ, DDQ, and chloranil. Similar effects were also reported at lower dopant concentrations down to 0.001%.

Also reported in that article were the color changes in the doped nematic liquid compositions of the present invention. More specifically, it was noted that chloranil, DDQ, and TCNQ doped into Phase V changed the yellow color thereof, respectively, to brown, green, and green.

The presence of these different colors strongly alters the cosmetic appearance of a display panel involving a nematic liquid crystal, as well as the apparent contrast between the regions exposed to an electric field and the regions not so exposed.

Continuing development of the invention since the publication in Applied Physics Letters has confirmed many of these early results and has demonstrated that similarly improved nematic liquid crystal compositions can be formulated using a variety of other nematic liquids and dopants, within the scope defined above. Included among the nematic liquids useful in the present invention are numerous p,p'-lower dialkoxy or alkylalkoxy azoxybenzenes, such as p,p'-di-n-butylazoxybenzene, p,p'-di-n-pentylazoxybenzene, and p-methoxy-p'-n-butylazoxybenzene.

While various compounds other than those specifically disclosed above are thought to be useful in the present invention, it is believed that the foregoing examples are sufficiently representative of the class indicated to demonstrate the efficacy of the present invention, and to represent the modified properties in nematic liquid crystal compositions which are attained by virtue of the compositions of the present invention. It should therefore be understood that the present invention is not believed to be limited to these specific compositions.

I claim:

1. A nematic liquid crystal composition consisting essentially of (a) a nematic liquid selected from the group consisting of azoxy, azo, ethylenic and acetylenic linked dibenzenes, substituted at the para positions with substituents selected from the group consisting of lower alkyls and lower alkoxies and (b) a nonionic charge-transfer acceptor dopant selected from the group consisting of a tetra halo-p-benzoquinone, chloranil, 2,3-dichloro-5,6-dicyano-p-benzoquinone, and 7,7,8,8-tetracyanoquinodimethane.

2. A composition, as recited in claim 1, wherein said nematic liquid is p,p'-di-n-butylazoxybenzene.

3. A composition, as recited in claim 1, wherein said nematic liquid is p,p'-di-n-pentylazoxybenzene.

4. A composition, as recited in claim 1, wherein said nematic liquid is p-methoxy-p'-n-butylazoxybenzene.

5. A composition, as recited in claim 1, wherein said nematic liquid is a binary mixture of p,p' lower dialkoxy or alkylalkoxy azoxybenzenes.

6. A composition, as recited in claim 1, wherein said dopant comprises less than 0.1%, by weight, of said composition.

* * * * *